United States Patent [19]

Kaplan

[11] Patent Number: 5,442,533

[45] Date of Patent: Aug. 15, 1995

[54] HIGH EFFICIENCY LINEAR LIGHT SOURCE

[75] Inventor: Martin C. Kaplan, Rochester, N.Y.

[73] Assignee: Eastman Kodak Company, Rochester, N.Y.

[21] Appl. No.: 263,638

[22] Filed: Jun. 22, 1994

[51] Int. Cl.⁶ .............................................. F21V 7/00
[52] U.S. Cl. ................... 362/303; 362/217; 362/298; 362/343; 362/347; 362/301
[58] Field of Search ............... 250/228; 355/67, 71; 358/474, 475, 491; 356/236; 362/217, 223, 297, 301, 302, 303, 343, 346, 305, 347, 349, 298

[56] References Cited

U.S. PATENT DOCUMENTS

| | | | |
|---|---|---|---|
| 4,321,030 | 3/1982 | Kramer | 358/294 |
| 4,371,258 | 2/1983 | Mast | 355/37 |
| 4,591,714 | 5/1986 | Goto et al. | 250/327.2 |
| 4,623,788 | 11/1986 | Kern et al. | 250/227 |
| 4,868,383 | 9/1989 | Kurtz et al. | 250/228 |
| 5,039,854 | 8/1991 | Yip et al. | 250/327.2 |
| 5,079,678 | 1/1992 | Parker | 362/84 |
| 5,103,385 | 4/1992 | Federico et al. | 362/298 |
| 5,155,596 | 10/1992 | Kurtz et al. | 358/214 |
| 5,215,370 | 6/1993 | Kaplan | 362/296 |
| 5,241,459 | 8/1993 | Kaplan et al. | 362/298 |
| 5,335,158 | 8/1994 | Kaplan et al. | 362/303 X |

Primary Examiner—Stephen F. Husar
Attorney, Agent, or Firm—David M. Woods

[57] ABSTRACT

A linear light source for a film scanner includes an elongated light integrating cavity, formed within a light integrator, having diffusely reflective walls. Light is introduced into the cavity through an input port, and an output scan line of diffuse light is produced through an exit slit which is generally parallel to the longitudinal axis of the integrating cavity. The scan line of light is directed on film to be scanned in a stripe of illumination. The scan line of the illuminated film stripe is imaged onto a tri-linear CCD array for conversion of color intensity modulated pixels into scan line data sets. The linear light beam is reflected from a source region within the integrating cavity visible through the exit slit. In order to make the brightness profile of the linear light beam more uniform and avoid position dependent signal level drop outs, sharp angle joints in the source region are replaced by arcuate sections. Particularly the right angle junctions of an interior longitudinal baffle with light integrator end walls are replaced by arcuate sections in the source region.

18 Claims, 5 Drawing Sheets

FIG. 1 (PRIOR ART)
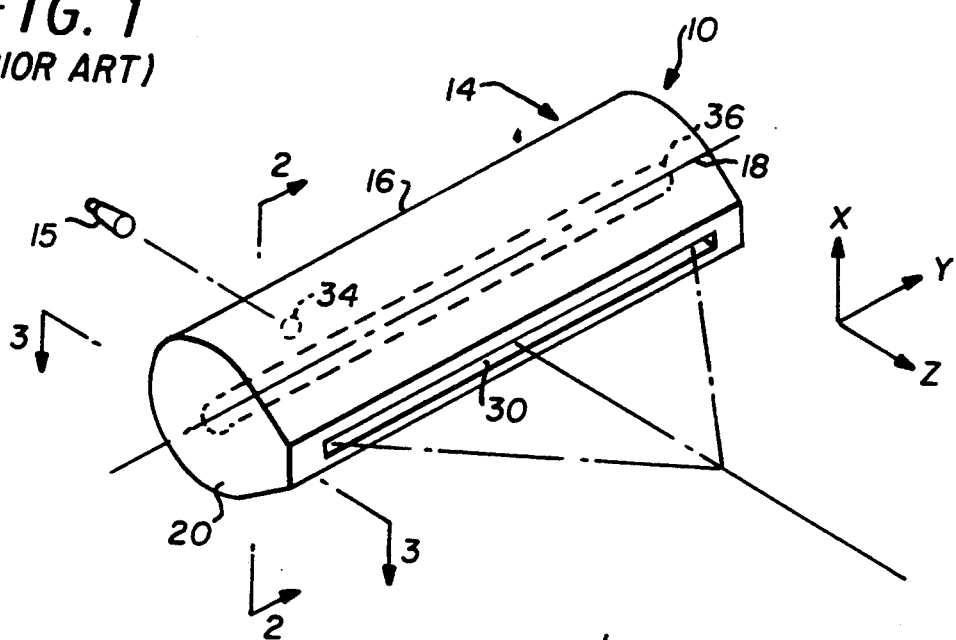
FIG. 2 (PRIOR ART)
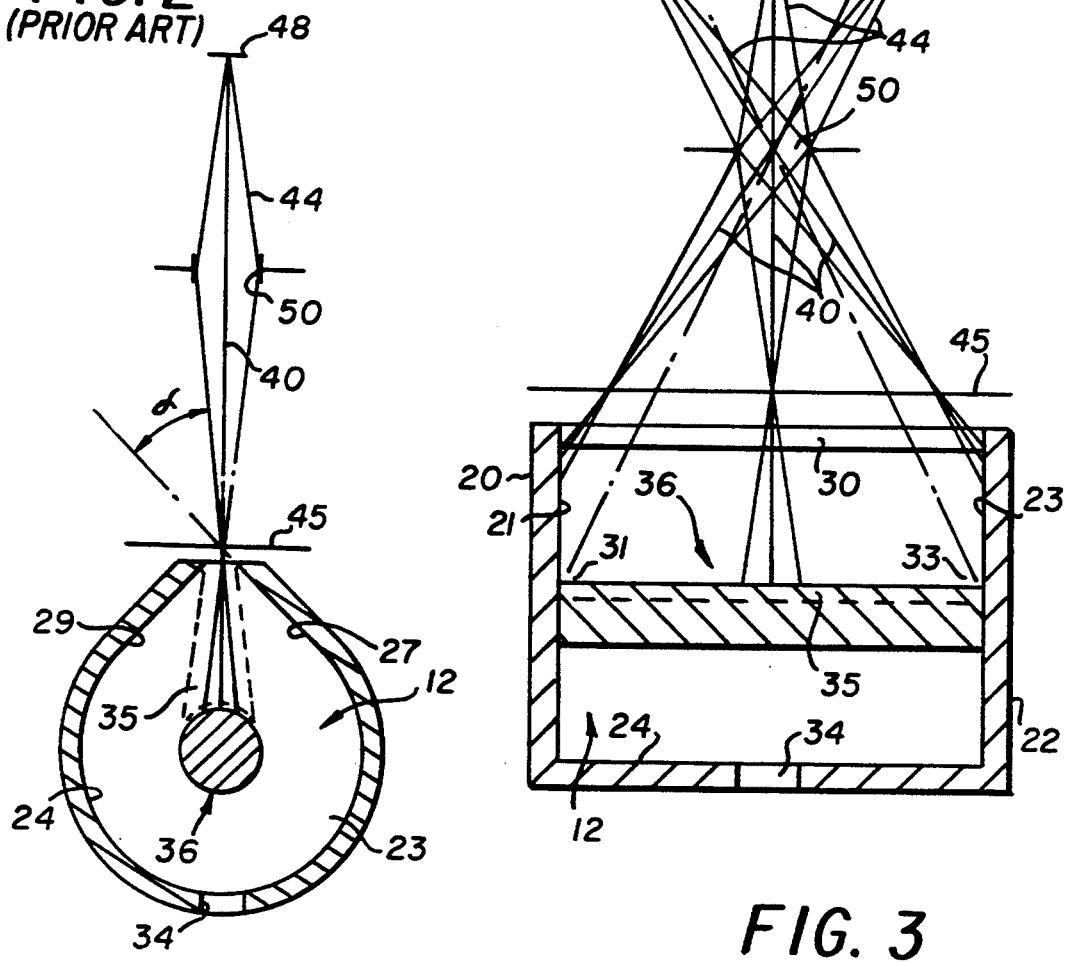
FIG. 3 (PRIOR ART)

HIGH EFFICIENCY LINEAR LIGHT SOURCE

REFERENCE TO RELATED APPLICATION

Reference is made to U.S. Patent application Ser. No. 797,661, entitled "Linear Light Source", filed on Nov. 25, 1991, now U.S. Pat. No. 5,215,370, in the name of Kaplan, and U.S. Patent application Ser. No. 887,197, entitled "High Efficiency Linear Light Source", filed on May 21, 1992, now U.S. Pat. No. 5,335,158, in the name of Kaplan et al.

FIELD OF THE INVENTION

The present invention relates to a linear light source, and more particularly, to such a light source for use in a film scanner.

BACKGROUND OF THE INVENTION

A film scanner typically includes a linear CCD array image sensor which provides a serial output of signals representing successive lines of an image. For color applications, the film scanner may include an assembly of three separate linear CCD array image sensors, or a tri-linear CCD array, one for each of the primary colors. The film is driven at a uniform rate past a linear light beam provided by an illumination system which illuminates a line section or stripe of the film. A scan line of the illuminated stripe is imaged onto each of the tri-linear CCD array image sensors. The film motion provides the frame scan, and the linear cycling of the CCD elements provides the line scan for each color. Film scanners of this type are disclosed, for example, in U.S. Pat. No. 4,868,383 and in the above-referenced '197 and '661 applications.

As shown in these applications and the '383 patent, it is common for film scanners to have an illumination system which produces a line or strip of light across the film that is imaged on the linear CCD array image sensor. The lamps used in such systems normally produce a circularly symmetric light beam, and there is a problem that is addressed with varying degrees of success in these systems in providing for an efficient conversion of the circular beam into a line of uniform intensity sufficient to provide a high signal to the CCD elements. In addition, it is the purpose of these systems to suppress the effects of film surface defects or artifacts by close positioning of the film plane with the light exit slit or aperture and by controlling the angular diffusion of the line of light. The uniform line of diffuse light suppresses film scratches which would otherwise appear in an image produced from the scanned information.

In the film scanners disclosed in the '383 patent and the above-referenced '197 and '661 applications, the linear light source for the film scanner includes the lamp for generating an intense beam of light, a set of filters for filtering the light beam, and an elongated cylindrical integrating cavity having diffusely reflective walls. The intense light beam is introduced into the integrating cavity through an input port and exits through a light exit slit or aperture which extends parallel to the longitudinal axis of the cylindrical integrating cavity.

In the '383 patent, the input port (or ports, when two lamps are used) is located in an end wall or the side wall of the cavity out of direct line of sight of the aperture to avoid the direct transmission of the incoming light beam out through the exit aperture, which can cause an undesirable effect. In commonly assigned U.S. Pat. No. 5,215,370, elongated plates are aligned with the exit aperture extending along and either inside or outside the cavity thereby reducing flare.

In commonly assigned U.S. Pat. No. 5,103,385 and in the above-referenced '197 application, for example, the light input port in the side wall is oriented directly across from the output aperture, and an axially extending baffle blocks the direct transmission of the incoming light beam out through the aperture. The centrally disposed baffle may be either rectangular or circular or otherwise shaped in cross-section, as long as the width or diameter is large enough to block the direct light transmission.

In each case, the incoming light is reflected off the surfaces inside the light integrating cavity one or more times before exiting through the aperture. Such linear light integrators produce a line of diffuse light which has a nearly uniform linear intensity and angularly diffuse distribution, and excellent results can be obtained over a wide range of operating conditions.

Problems to be Solved by the Invention

However, in such systems, it has not been generally recognized that sharp corners in the integrating cavity geometry can produce an undesirable non-uniformity in the light output. The cylindrical integrating cavities generally have right angles where the side wall and end walls meet and where interior, axial baffles are supported by the end walls. These sharp angles produce small, but sometimes significant, non-uniformities in the light intensity along the length of the exit aperture.

SUMMARY OF THE INVENTION

It is an object of the present invention to overcome the problems in the prior art discussed above and to provide an improved linear light source for a film scanner.

It is a further object of the present invention to reduce non-linearities in uniformity of intensity of light emitted from the elongated aperture of a light integrator.

In accordance with one aspect of the present invention, there is provided a linear light source comprising a source for producing a beam of radiation; an elongated light integrator forming a light integrating cavity defined by cavity end walls and a side wall extending therebetween and having diffusely-reflecting interior surfaces, the cavity walls having an input port through which the beam is introduced into the cavity and a light output slit in the side wall extending generally parallel to a longitudinal axis of the cavity, a baffle in the cavity located between the input port and the output slit and extending longitudinally between the cavity end walls, the baffle and the interior surfaces of the side walls defining a source region for light reflected through the light output slit as a scan line of light, the baffle having arcuate sections where joined with the end walls for reducing drop out in brightness of light reflected from the source region at the junction of the baffle with the side walls.

The scan line of light is directed on film to be scanned in a stripe of illumination. The stripe of illumination is imaged onto a linear CCD array for conversion of color intensity modulated pixels into line data sets. The output scan line is reflected from a source region within the integrating cavity visible to the linear CCD array. In order to make the brightness profile of the scan line of light more uniform and avoid position dependent signal level drop outs, sharp angle joints in the source region are replaced by arcuate sections. Particularly the right angle junctions of the interior longitudinal baffle with light integrator end walls are replaced by arcuate sections in the source region.

In one embodiment of the present invention, the baffle is rod shaped and extends axially through the length of the light integrator having a first diffusely reflective surface for reflecting the light beam entering through the input port away from the exit slit and a second diffusively reflective surface defining a portion of the source region. The baffle includes first and second expanded diameter ends formed with arcuate sections extending between the second diffusively reflective surface and the expanded diameter ends to eliminate sharp angles.

In one preferred embodiment, the light integrator is formed with end walls or caps having recesses formed therein for receiving the expanded diameter ends of the baffle. The expanded diameter ends terminate in peripheral rims of a certain thickness less than the depth of the recesses to eliminate visible gaps in the source region. In a further embodiment, the end walls of the integrating cavity are replaced by the expanded diameter ends of the baffle. The second diffusively reflective surface may form a sector of a baffle that is circular in cross section or may be formed of a flattened side of the baffle.

In a still further embodiment, in a light integrator cavity without a baffle, the end walls are formed with curved sections at their periphery that eliminates the right angle joints between the side and end walls.

Advantages of the Invention

A principal advantage of the disclosed invention is that it is a highly efficient linear light source that permits a high degree of light concentration and uniformity in brightness profile of the scan line of light. A further advantage is that the light source includes an integrating cavity in which the walls adjacent the output slit are constructed such that the light source can be closely positioned adjacent the film scanning plane, thereby providing an optimal distribution of light on the film and achieving a high degree of scratch suppression, while minimizing obstruction of the space near the film. Thus, the linear light source of the present invention produces an intense line of light having a highly uniform intensity along its length and a substantially uniform angular distribution that is particularly effective in suppressing the effects of film surface damage, such as a scratch, on a reproduced image.

BRIEF DESCRIPTION OF THE DRAWINGS

Other objects, advantages and features of the present invention will become apparent from the following specification when taken in conjunction with the accompanying drawings in which like elements are commonly enumerated and in which:

FIG. 1 is a perspective view of a linear light integrator in relation to a light source of a type having an axial baffle therein in which the present invention may be practiced;

FIG. 2 is a sectional view, taken along the line 2—2 in FIG. 1, of the prior art light integrator construction showing the orientation of the interior light baffle with the light input port and the light exit aperture and the source region within the cavity of the diffuse light exiting the exit aperture in a plane perpendicular to the aperture;

FIG. 3 is a sectional view, taken along line 3—3 in FIG. 1, of the prior art light integrator construction showing the orientation of the interior light baffle with the light input port and the light exit aperture and the source region within the cavity of the diffuse light exiting the exit aperture in a plane parallel with the aperture;

The drawings are not necessarily to scale.

DETAILED DESCRIPTION OF THE PREFERRED EMBODIMENTS

Figure 6:
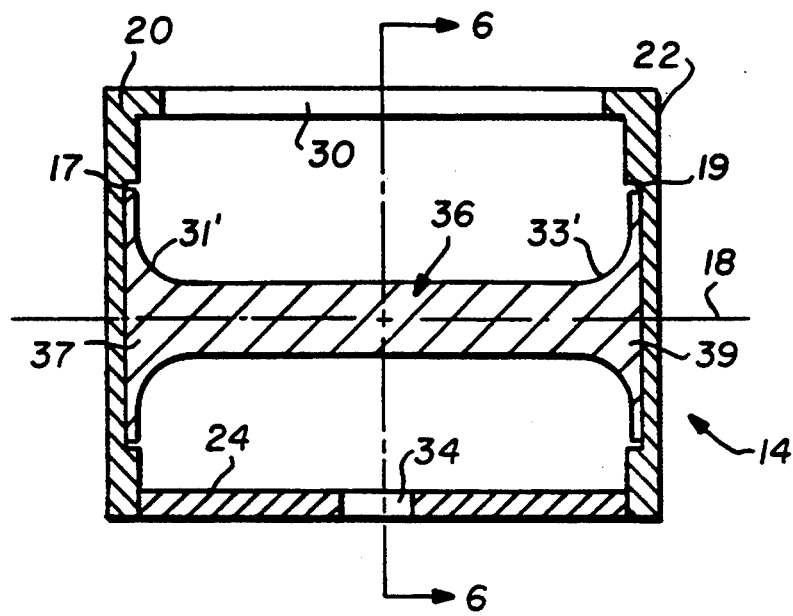
FIG. 6 is a lengthwise sectional view, taken along line 3—3 in FIG. 1, showing the altered profile of a first embodiment of the baffle and end wall in accordance with the invention to eliminate sharp corners in the source region of a light integrator of the type depicted in FIG. 1.
Figure 7:
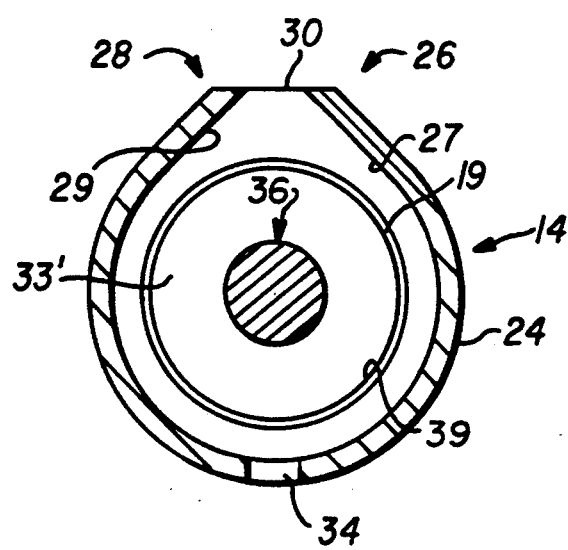
FIG. 7 is an end sectional view, taken along line 6—6 in FIG. 6 depicting a light baffle of circular cross-section.
Figure 8:
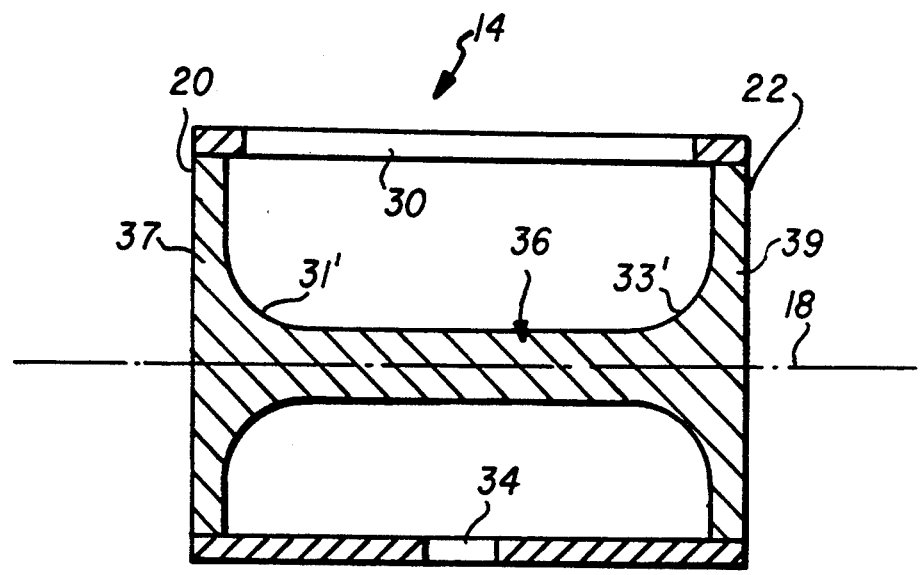
FIG. 8 is a lengthwise sectional view, taken along line 3—3 in FIG. 1, showing the altered profile of a second embodiment of the baffle and end wall in accordance with the invention to eliminate sharp corners in the source region of a light integrator of the type depicted in FIG. 1.
Figure 9:
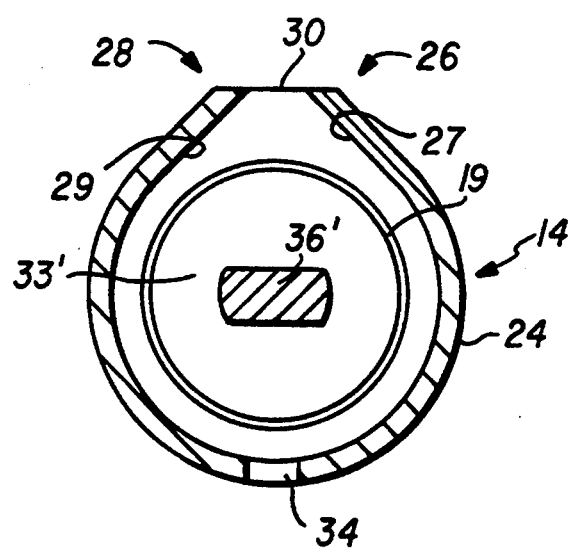
FIG. 9 is an end sectional view, taken along line 6—6 in FIG. 6 depicting a light baffle of rectangular or square cross-section.

With reference to FIGS. 1, there is shown a linear light source 10 of the type depicted in the above-referenced '385 patent in which the present invention may be implemented. FIGS. 2 and 3 are section views of the light integrator of FIG. 1 depicting the prior art interior construction as found, for example, in the '385 patent. FIGS. 6 and 7 are section views illustrating one embodiment of the invention practiced in the linear light source 10 of FIG. 1, and FIGS. 8 and 9 are section views illustrating further embodiments of the invention that may be practiced in the linear light source of FIG. 1. Consequently, FIG. 1 when understood in conjunction with FIGS. 2 and 3 is illustrative of the prior art, whereas when understood in conjunction with FIGS. 6-9 is illustrative of the alternative preferred embodiments of the invention.

Linear light source 10 includes a light integrator 14 having an elongated light integrating cavity 12 formed therein about a longitudinal axis 18. The cavity 12 is formed by a generally cylindrical side wall surface 24 tangentially extending into two generally planar wall surface portions 27 and 29, respectively, which meet to form a light exit slit or aperture 30, and is bounded by end walls or caps 20 and 22.

The light integrator 14 of linear light source 10 is preferably made from aluminum, and the light-contacting surfaces within the integrating cavity 12 are painted with Spectraflect paint which is a highly diffusively reflective white paint obtainable from the Labsphere Corp., North Sutton, N.H. The components of the light integrator 14 may alternatively be machined from a plastic material, e.g. Spectralon plastic, also available from Labsphere, Corp., or other suitable material where it is not necessary to paint the interior side wall and end surfaces with reflective white paint. In one exemplary device, the cavity 12 is 27 mm long and the cylindrical wall portion 24 is 35.54 mm in diameter. The input port 34 is a round hole 12.5 mm in diameter, and the exit slit 30 is 2.5 mm wide by 27 mm long.

Linear light source 10 also includes a lamp 15 and lens and filter system (not shown) which directs a light beam into integrating cavity 12 through an input port 34. Lamp 15 can be, for example, a xenon lamp. One suitable xenon lamp is a Model No. LX-300f, manufactured by ILC Cermax Lamps. Other lamps can be used, e.g., a 24 volt DC tungsten-halogen lamp, type ELC, manufactured by General Electric Corporation. The light beam from lamp 15 may be directed into the entry port 34 in the manner described in the above-referenced '197 application incorporated herein by reference, or by any other suitable means.

The light beam from lamp 15 entering input port 34 is reflected from the surfaces of the integrating cavity 12 until it escapes, through the light exit slit or aperture 30, as a line of light or a linear light beam having an optical axis in the Z-direction perpendicular to the cavity axis 18 Y-direction. A baffle 36, in the shape of a cylindrical rod, is located along the longitudinal axis 18 extending between the end walls or caps 20, 22 to prevent light entering the input port in the Z-direction from passing directly out the exit slit 30. The baffle 36 keeps any input light from exiting the cavity 12 without reflecting off of at least one internal cavity surface. All internal surfaces of cavity 12, including surfaces of baffle 36, are highly reflective diffuse surfaces as described above. The position of the input port 34 along the Y-direction is non-critical. The preferred position for the input port 34 is centered relative to the output slit 30 along the cavity axis 18.

FIGS. 2 and 3 schematically depict a film scanner employing the linear light source 10 of FIG. 1, wherein the exit slit 30 of the light integrator 14 is aligned with respect to a film scanning plane 45 which is imaged through a scanning lens aperture 50 onto a linear photosensor or CCD array plane 48. The linear light beam emitted from the exit slit 30 is represented in FIG. 2 in the X-direction view and FIG. 3 in the Y-direction view as being directed along the Z-direction optical axis coincident with the chief ray 40 of the imaging lens aperture 50.

The elongated stripe of light passes through the film in the film plane 45 and is color and intensity modulated by the partially transmitting photographic color image on the film. The objective lens aperture 50 images a scan line of the modulated stripe of light from the film onto the linear CCD array or other photosensor array in array plane 48, which divides the light pattern from the film into a plurality of pixels representing the content of a scan line of the photographic image. The illuminated scan line imaged on the linear CCD or photosensor array may be narrower than the linear light beam that illuminates a stripe of the film in film scanning plane 45. The film is moved past the exit slit 30, in the X-direction, orthogonal to the film width in the Y-direction, and a sequence of three color line image data sets is generated by the tri-linear CCD array in a manner known in the art. The sequence of line image data sets, with each line containing a plurality of pixels, represents the two-dimensional image on the film image frame moved through the film scanning plane 45.

Tangentially extending, planar walls 27 and 29 are arranged to make it possible to closely position the light source 10 adjacent the film in a scanner, thereby achieving an optimal distribution of diffuse light at the film, and a high degree of scratch suppression, while minimally obstructing the space near the film. Walls 27 and 29 define interior surfaces which are disposed at an angle $\alpha$ (FIG. 2) of about 45° to the optical axis. As shown in FIG. 2, walls 27 and 29 extend outward in a generally wedge shape to position slit 30 close to the film scanning plane 45. As a result of this wedge shape, mechanical interference with other elements of a film gate (not shown) is minimized, and a minimum gap between the output slit 30 and the film in film scanning plane 45 is provided.

Diffuse illumination of the film in film scanning plane 45 at angles extending out to approximately ±45° will provide good scratch suppression; this dictates that the output slit 30 width be at least approximately two times the distance from slit 30 to the film scanning plane 45. By reducing the distance from slit 30 to the film plane 45, the size of the slit 30 can be minimized which produces higher radiance and better uniformity.

In such systems, it is generally assumed that the light is well randomized by the multiple reflections within the integrating cavity 12, causing the light leaving the exit slit 30 to be spatially uniform and angularly diffuse. The illumination system is then presumed to be well approximated as a spatially uniform, rectangular (same size as the cavity exit slit 30) Lambertian light source. The errors in such an approximation, while generally ignored, are sometimes significant, as explained further in conjunction with FIGS. 2–5.

The imaging of the scan line on the film in the film plane 45 is schematically illustrated in FIGS. 2 and 3 by the chief rays 40 and the marginal rays 44 of the optical rays imaged onto the photosensor array plane 48 by the imaging lens. In FIG. 3, the center and the left and right extremes of the chief rays 40 and marginal rays 44 are depicted. This schematic illustration identifies the "source region" of the light reflected from the baffle 36 and the end wall surfaces 21, 23, out the exit slit 30, through the film plane 45 and imaged on the array plane 48. As described earlier, the light integrator 14 is arranged to prevent light entering the input port 34 from directly exiting through the exit slit 30. In this process, the lamp 15 (FIG. 1) produces the light beam that is projected through the input port 34 into the light integrating cavity 12. The light reflects off the elongated side wall 24 or the baffle 36 back onto the side wall 24, the end wall surfaces 21, 23 and the baffle 36 one or more times until it reflects off the source region 35, as indicated in FIGS. 2 and 3, exits through aperture 30, and is imaged onto the photosensor array plane 48. The source region 35 extends in a band along the surface of baffle 36 through the right angle joints 31, 33 with the interior end wall surfaces 21, 23 and up the interior surfaces 21, 23 to the ends of the exit slit 30.

Figure 4:
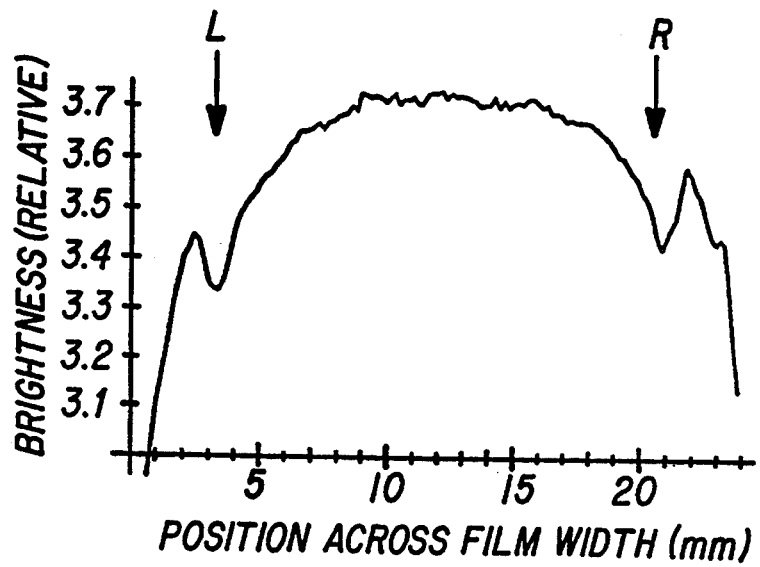
FIG. 4 is a chart depicting the spatial profile of illumination brightness across a stripe of light on an image frame of a film strip showing the location of intensity drop outs due to sharp corners of the source region of the light integrator constructed as shown in FIGS. 2 and 3.

FIG. 4 shows the measured output from the linear CCD array for the scanner of the type shown in FIGS. 1-3, in a case where no film is present in the film plane 45. Ideally, the profile in FIG. 4 should be flat, since there is no film image present to modulate the light. The non-flat structure of FIG. 4 will also be present in any signal collected with film present, and will be compounded with image information modulation of the film. The gradual fall-off of the profile in FIG. 4 produces an effect similar to vignetting (a fall-off of brightness toward the edges of a photographic image, often caused by photographic lens performance), which often is not noticeable, and often not objectionable even when noticeable. However, the two narrow brightness level drop outs in the profile (highlighted by arrows R and L in FIG. 4) show a decreased brightness at right and left positions along the linear CCD array. The brightness level drop outs repeat for each line in a scanned photographic image, thereby causing right and left streaks in images reproduced using the image data. Such streaks have been observed and found objectionable.

Knowledge of the illumination profile (as in FIG. 4) may be used to compensate by digital image processing of the line data sets after the image data has been accumulated or during the readout and digitization of the pixel data corresponding positionally to the R and L drop outs. However, such compensation may be undesirable because of the cost of fine tuning each film scanner or other reasons that affect the consistency of the profile over time. Also, the illumination profile may be unknown, or may vary. For example, if the film scanning plane 45 is moved farther from the slit 30, and the imaging lens or linear CCD array plane 48 is moved to maintain focus, then the illumination profile will change.

The optical performance of the integrating cavity illumination system is usually approximated by describing the scan line of light as equivalent to a nearly uniform, Lambertian source. This approximation fails to describe the drop outs R and L in the illumination profile of FIG. 4, and has led to designs having such undesirable drop outs in the profile.

The cause of the drop outs in the profile can be understood from an examination of the source region 35 illustrated in FIGS. 2 and 3. The right angle corners or joints 31, 33 between the baffle 36 and the flat end surfaces 21, 23 of the cylindrical integrating cavity 12 are the source of the dips and cause several problems. First, light approaching the vicinity of the joint 31, 33 may multiply reflect several times off the two adjacent source region 35 surfaces on the baffle 36 and end wall surfaces 21, 23, near each joint, before finally departing from the source region adjacent the joint. The more acute the angle of the joint, the larger the number of reflections. Since the white interior surfaces are less than 100% reflective, the multiple reflections cause a larger loss (by absorption) of light than reflection from a single smooth surface. Thus, the joints 31, 33 and the source region near each joint reflect less light and appear darker than a smooth or flat surface.

Figure 5:
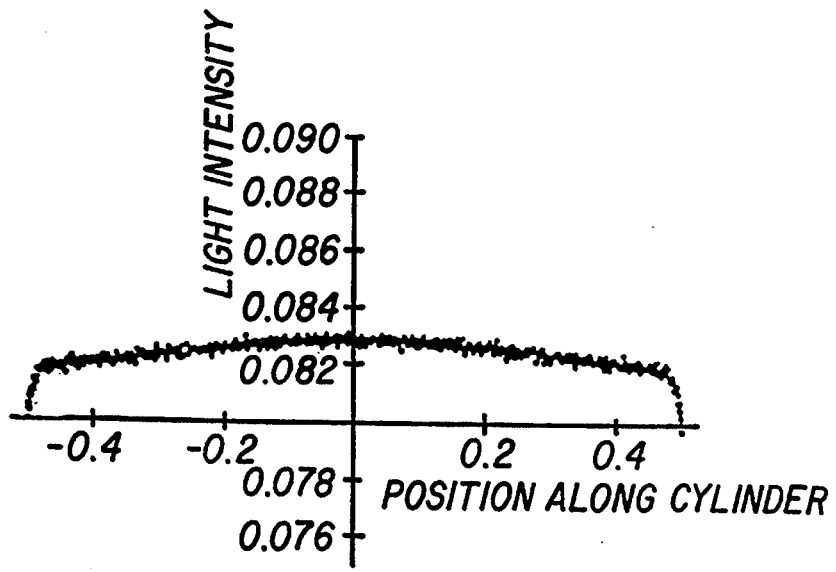
FIG. 5 is a chart depicting the spatial profile of light intensity reflected from a cylindrical surface extending from right-angle joints with flat end surfaces.

This effect can also be seen in FIG. 5, which shows a theoretical Monte Carlo calculation of the light intensity reflected from the cylindrical surface of a cylindrical cavity of one inch (2.54 mm) diameter and one inch (2.54 mm) length, with flat end caps at both ends of the cylinder, all surfaces having reflectivity of 99%, with a spherically uniform light source located at the center of the cavity. Note the sudden fall-off in light intensity at each end of the cylinder, at 0.5 and −0.5 inches, near the right angle joint between the cylindrical surface and the flat end caps.

Second, where two separate pieces are connected at the joint, any small gap in the seam permits light to escape. The loss of light causes less light to be reflected from the joint, in turn causing the joint to appear darker than a smooth surface. Moreover, joining the two pieces to form a joint may cause damage to the surface finish of the respective pieces near the joint, for example, scraping off white paint.

Third, air flow in the vicinity of the joint will be obstructed by the geometry of the joint, causing more accumulation of dust and other contaminants. Since most contaminants will have a lower reflectivity than the white surfaces, this will make the joint appear darker.

Fourth, the sharp joint between two surfaces is a sudden change in angle from one surface to the other. If the white surfaces are not ideal Lambertian reflectors, then the surfaces have different reflectivities at different angles, and the sudden change in angle also causes a sudden change in reflectivity.

The dashed lines in FIG. 3 show optical paths for the chief rays of light from the baffle and side wall joints 31 and 33, through the cavity exit slit 30, through the film plane 45, through the objective lens aperture 50, to the linear CCD array plane 48 at the L and R positions, respectively. This shows that the slight darkening at the baffle joints 31, 33 described above will cause a slight darkening in the illumination profile as seen at positions L, R on the linear CCD array slightly away from the outer edges of the image scan line, i.e. at positions corresponding to the arrows L and R in FIG. 4.

To eliminate the dips or drop outs in the illumination profile, the right angle joints must be eliminated. FIGS. 6 and 7 show how the design of FIGS. 1-3 may be modified to eliminate right angle joints 31, 33. The ends of the cylindrical baffle 36 are flared outward by curving the surface of the cylindrical baffle 36 into a spool shape to eliminate the 90° joint with the end wall surfaces 21, 23. In this first embodiment, the end walls or caps 20, 22 are retained but are each formed with an interior circular recess 17, 19 into which the rims of the curved, expanded diameter baffle ends 37, 39 are received when the light integrator 14 is assembled. The 90° joints 31, 33 are replaced by arcuate, flared surface sections 31', 33', joining the post of baffle 36 to its expanded diameter ends 37, 39.

It is also important that gaps at the seams between the edges of the recesses 17, 19 and the expanded diameter ends 37, 39 do not cause a dip in the brightness profile. Therefore, the seam is recessed by making the depth of the circular recesses 17, 19 greater than the thickness of the periphery of each of the ends 37, 39, so that the gap is hidden from the view of the linear CCD array in the plane 48.

FIG. 8 shows a more radical modification to the design of the baffle 36 by expanding the baffle ends 37, 39 to form integral baffle end caps 37', 39'. The expanded baffle end caps 37', 39' are of a diameter and shape that fits into the end openings of side wall 24 as illustrated. In this particular case, the tangential side wall extensions 26, 28 require that the end caps 37', 39' only fit in one angular orientation. In other, fully circular integrating cavity 12 configurations, the baffle end caps 37', 39' would be made circular (as in FIGS. 6 and 7) to fit into the side wall circular end openings and seal the end openings in any angular orientation.

Alternatively, in the circular integrating cavity, the baffle end caps could be made larger than the end openings, and the side wall 24 could be made of two half sections with section halves running through the exit slit 30 and the input port 34. When assembled with the baffle, the joint line in the opposite side wall would be hidden from the exit slit.

FIGS. 6 and 8, in conjunction with the alternative cross-section view of FIG. 9, also illustrate the further embodiment where the post of baffle 36 is not circular, e.g. as depicted in the '385 patent. In such an embodiment, the flat post source region 35 of rectangular or square baffle 36' faces the exit slit 30. In accordance with this further embodiment of the invention, the flat baffle 36' is shaped with the arcuate surface sections 31', 33' depicted in FIGS. 6 or 8 on the side facing the slit 30 and (optionally) on one or all of the remaining sides. Such a flattened post baffle 36' could be fabricated with ends 37, 39; 37', 39' in accordance with either of the embodiments of FIGS. 6–8.

FIGS. 6 and 8, in comparison to FIG. 3, also show that the exit slit 30 may be shorter in length than the integrating cavity 12 so that the source region 35 falls entirely on the post of the baffle 36 and the arcuate surface sections 31', 33' and not along the interior end surfaces 21, 23. In particular, the joints at the recesses 17, 19 within which the widened ends 37, 39 are seated are not seen by the linear CCD array, and do not cause noticeable drop outs.

In a further set of embodiments, the baffle 36 may be eliminated by relocating the input port 34 at a position other than 180° position opposite the exit slit 30. In this case, the joints between the cylinder and the end caps can cause drop outs. The joints may be replaced by smooth, curved surfaces in the source region. Or the cavity may be elongated to move the joints out of the view of the linear CCD array plane 48 (i.e. out of the source region).

Figure 10:
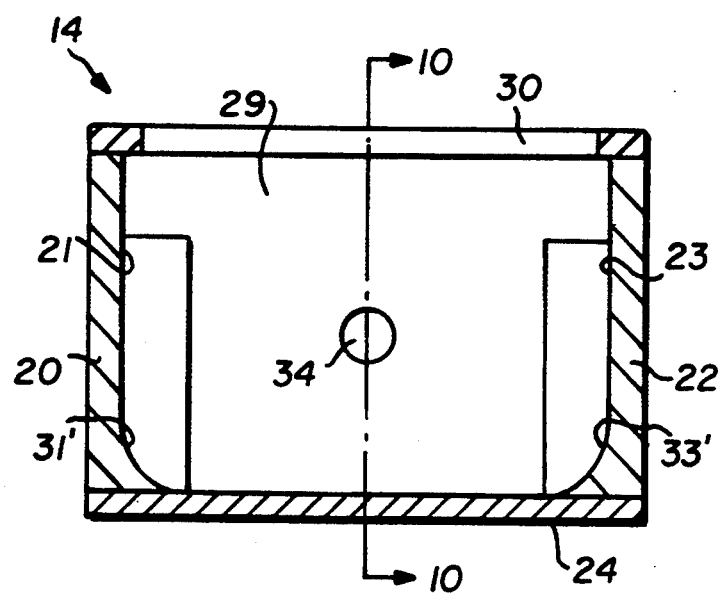
FIG. 10 is a lengthwise sectional view, taken along line 3—3 in FIG. 1, showing the altered profile of a third embodiment of the invention in a light integrator without a baffle.
Figure 11:
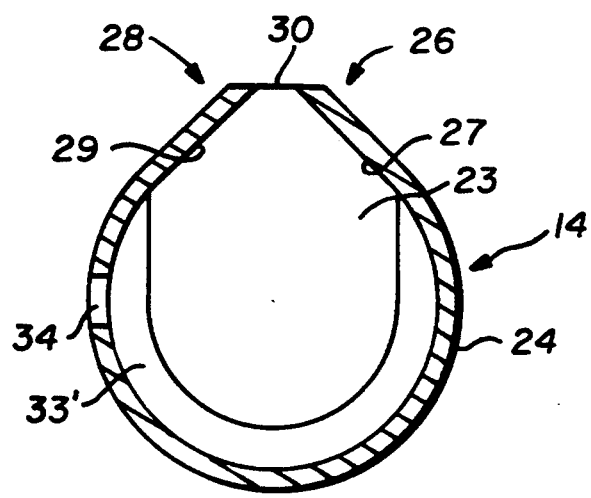
FIG. 11 is an end sectional view, taken along line 10—10 in FIG. 10 depicting the curvature of the joint of the end and side walls.

FIGS. 10 and 11 depict one such design employing many of the features of the light integrator of FIG. 1 except that the baffle 36 is eliminated and the input port 34 is moved to a position about 90° away in the side wall 24 from the exit slit 30. The end walls 20, 22 are formed with curved sections 31', 33' that extend part way around the periphery of the joints between the end walls 20, 22 and the side wall 24 but stop at the juncture with the tangential side wall extensions 26, 28 at the surface portions 27, 29. The source region in this case includes portions of the curved sections 31', 33', the end wall surfaces 21, 23 and the side wall 24 interior surface.

The side wall 24 and end walls 20, 22 thus meet in a line contact of the periphery of the curved sections 31', 33' in the example depicted in FIGS. 10 and 11. It will be understood that the side wall 24 and end walls 20, 22 may be fabricated of a single piece to avoid the line junctions. In such a case, the tangential side wall extensions 26, 28 may be formed of separate pieces and be attached to the single piece end and side wall unit. The junction line would then be in the plane of the surfaces 27, 29 and not visible from the linear CCD array plane 48.

All of the embodiments depicted have incorporated the tangential side wall extensions 26, 28 to project the exit slit 30 laterally to the cavity axis 18. It will be understood that the invention may be just as readily practiced in a light integrator of any shape, including the typical, circular cylindrical shapes depicted in the above-referenced patents. Moreover, the invention may be practiced in non-standard shaped light integrators, e.g. elongated rectangular shaped integrators having flat side and end walls, wherein the junctions of the walls within the source region are curved. In any shape light integrator, the invention may be practiced by substituting curved surfaces for the sharp angles of wall-to-wall or wall-to-baffle joints in the source region to decrease or practically eliminate intensity drop outs in light output.

In addition, all of the depicted embodiments show the input port 34 in the side wall 24. It will be understood that the invention may be employed as well in light integrators having the light input port or ports in the end wall or walls, respectively, of the light integrator.

Furthermore, it will be understood, in the embodiments of the invention described above, the input port 34 can be located in positions around the side wall 24 other than the 180° position depicted in FIGS. 6–9.

Another embodiment of the invention is envisaged including the high collection, non-imaging optical device, particularly the curved wall concentrator, which is shown in the form of a compound parabolic concentrator, in the above-referenced '197 application.

Light integrating cavities may also be used as light collectors, rather than light sources. Generally, in such applications, the path of the light is reversed, i.e. the light to be collected enters the long slit in the cavity, multiply reflects within the cavity, and exits through the round hole. Often the light exiting from the round hole enters a detector, such as a photomultiplier or silicon photocell. All of the above considerations apply equally to such integrating cavity light collectors: the joints cause excess absorption of the light, causing the light collection efficiency profile to have dropouts. This flaw may be corrected by eliminating or modifying the joints, as described above. These problems occur also in non-cylindrical integrating cavity light collectors which have joints, and again may be corrected by eliminating the joints in a manner similar to that described above.

In each of the embodiments, temporal control of the illumination intensity of the light source can be achieved by sampling the diffuse light from the integrating cavity 12. Such a system is disclosed in the aforementioned '383 patent, incorporated herein by reference. As disclosed in the '383 patent, a feedback port can be provided in the integrating cavity 12 to remove a sample of the diffuse light. The light exiting the feedback port is directed by means of an optical fiber to a photosensor such as a silicon photodiode. The output from the photodiode is provided through a feedback circuit to a power supply for the light source.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–11 linear light source 10
integrating cavity 12
light integrator 14
lamp 15
circular recesses 17, 19 longitudinal axis 18
end walls or caps 20, 22
interior end wall surfaces 21, 23
side wall 24
tangential side wall extensions 26, 28
generally planar wall surface portions 27, 29
light exit slit or aperture 30
corners or joints 31, 33
arcuate surface sections 31', 33'
light beam input port 34
source region 35
circular baffle 36
flat sided baffle 36'
expanded baffle post ends 37, 39
chief ray 40
scan line envelope 44
film scanning plane 45
array plane 48
imaging lens aperture 50

I claim:

1. A linear light source comprising:
a source for producing a beam of radiation; and
an elongated light integrator forming a light integrating cavity defined by cavity end walls and a side wall extending therebetween and having diffusely-reflecting interior surfaces, said cavity walls having an input port through which said beam is introduced into said cavity and a light output slit in said side wall extending generally parallel to a longitudinal axis of said cavity, a portion of interior surfaces of said side wall and end walls defining a source region for light reflected through said light output slit, wherein the junctions of said side wall and said end walls are formed in arcuate sections for reducing drop out in brightness of light reflected from said source region at the junctions.

2. A linear light source as defined in claim 1 wherein said side wall is generally cylindrical through its length having a relatively uniform diameter in the source region between said arcuate sections and progressively shrinking diameter through said end arcuate sections as the end arcuate sections merge into said end walls.

3. The linear light source of claim 2 wherein said end walls and said side wall are formed in a unitary structure in the source region.

4. A linear light source as defined in claim 1 wherein said side wall is generally circular in cross-section through its length having a relatively uniform diameter in the source region, and said arcuate sections are formed in said end walls to merge into said side wall.

5. A linear light source comprising:
a source for producing a beam of radiation; and
an elongated light integrator forming a light integrating cavity defined by cavity end walls and a side wall extending therebetween and having diffusely-reflecting interior surfaces, said cavity walls having an input port through which said beam is introduced into said cavity and a light output slit in said side wall extending generally parallel to a longitudinal axis of said cavity, a baffle in said cavity located between said input port and said output slit and joined with and extending longitudinally between said cavity end walls, said baffle and the interior surfaces of said end walls defining a source region for light reflected through said light output slit, and said baffle having end arcuate sections where joined with said end walls for reducing drop out in brightness of light reflected from said source region at the junction of said baffle with said end walls.

6. A linear light source as defined in claim 5 wherein said baffle is generally circular in cross-section through its length having a relatively uniform diameter sufficient to mask said output slit from direct view through said input port through its length and having a progressively expanding diameter through said end arcuate sections to form enlarged diameter ends of said baffle.

7. A linear light source as defined in claim 6 wherein said enlarged diameter baffle ends are integral with said cavity end walls, and said cavity end walls seal end openings of said longitudinally extending side wall to form said integrating cavity with said baffle extending axially through the length thereof.

8. A linear light source as defined in claim 6 wherein said enlarged diameter baffle ends are integral with said cavity end walls, and said cavity end walls fit within and seal end openings of said longitudinally extending side wall to form said integrating cavity with said baffle extending axially through the length thereof.

9. A linear light source as defined in claim 6 wherein:
said enlarged diameter baffle ends are of a predetermined thickness at the peripheral rims thereof; and
said cavity end walls are formed with recesses of a depth exceeding said predetermined thickness for receiving said enlarged diameter baffle ends in said recesses to eliminate visible gaps in the source region.

10. A linear light source as defined in claim 9 wherein:
said cavity end walls are shaped to seal end openings of said longitudinally extending side wall to form said integrating cavity with said baffle extending axially through the length thereof.

11. A linear light source as defined in claim 5 wherein said baffle is generally rod shaped and flattened in cross-section and extends axially through the length of the light integrator having a first diffusely reflective flat surface for reflecting the light beam entering through the input port away from the exit slit and a second diffusively reflective flat surface defining a portion of the source region, said baffle having first and second expanded diameter ends formed with arcuate sections extending between the second diffusively reflective surface and the expanded diameter ends to eliminate sharp angles.

12. A linear light source as defined in claim 11 wherein said enlarged baffle ends are integral with said cavity end walls, and said cavity end walls seal end openings of said longitudinally extending side wall to form said integrating cavity with said baffle extending axially through the length thereof.

13. A linear light source as defined in claim 11 wherein said enlarged baffle ends are integral with said cavity end walls, and said cavity end walls fit within and seal end openings of said longitudinally extending side wall to form said integrating cavity with said baffle extending axially through the length thereof.

14. A linear light source as defined in claim 12 wherein:
said enlarged diameter baffle ends are of a predetermined thickness at the peripheral rims thereof; and
said cavity end walls are formed with recesses of a depth exceeding said predetermined thickness for receiving said enlarged diameter baffle ends in said recesses to eliminate visible gaps in the source region.

15. A linear light source as defined in claim 14 wherein:

said cavity end walls are shaped to seal end openings of said longitudinally extending side wall to form said integrating cavity with said baffle extending axially through the length thereof.

16. A linear light source, as defined in claim 5 wherein the interior surfaces of said cavity walls adjacent said output slit are generally planar and form an angle with an optical axis, said optical axis being generally perpendicular to said longitudinal axis.

17. A linear light source, as defined in claim 16, wherein said interior surfaces of the cavity walls adjacent said output slit are joined by a generally cylindrical surface.

18. A linear light source, as defined in claim 17, wherein said interior surfaces of the cavity walls adjacent said output slit are joined tangentially to said cylindrical surface.

* * * * *